United States Patent
Owyang (10) Patent No.: US 7,628,094 B2
(45) Date of Patent: Dec. 8, 2009

(54) CABLE TENSION ADJUSTMENT ASSEMBLY

(76) Inventor: Mon Spencer Owyang, 501 Carson La., La Selva Beach, CA (US) 95076

( * ) Notice: Subject to any disclaimer, the term of this patent is extended or adjusted under 35 U.S.C. 154(b) by 588 days.

(21) Appl. No.: 11/203,936

(22) Filed: Aug. 15, 2005

(65) Prior Publication Data

US 2006/0117901 A1    Jun. 8, 2006

Related U.S. Application Data (60) Provisional application No. 60/633,344, filed on Dec. 4, 2004.

(51) Int. Cl.
*F16C 1/22*    (2006.01)
(52) U.S. Cl. .................................... 74/500.5
(58) Field of Classification Search .................. 74/51, 74/41 R, 413, 414, 500.5, 501.5 R, 501.6, 74/502.2, 502.4, 502.5, 502.62
See application file for complete search history.

(56) References Cited

U.S. PATENT DOCUMENTS

| | | | |
|---|---|---|---|
| 3,759,352 A | | 9/1973 | Toplis |
| 3,997,030 A | | 12/1976 | Yoshigai |
| 4,007,647 A | * | 2/1977 | Carlson ..................... 74/502.4 |
| 4,066,154 A | | 1/1978 | Ross |
| 4,914,971 A | | 4/1990 | Hinkens et al. |
| 5,293,785 A | * | 3/1994 | Lichtenberg ............... 74/500.5 |
| 5,419,216 A | | 5/1995 | Hinschlager |
| 5,544,543 A | * | 8/1996 | Hilgert et al. .............. 74/502.4 |
| 5,674,142 A | * | 10/1997 | Jordan ........................ 474/80 |
| 5,839,544 A | | 11/1998 | Yamashita |
| 6,098,489 A | * | 8/2000 | Van Zanten et al. ........ 74/502.6 |
| 6,161,448 A | * | 12/2000 | Wang ........................ 74/502.2 |
| 6,431,326 B1 | * | 8/2002 | Takizawa ................. 188/24.11 |
| 6,651,523 B2 | | 11/2003 | Chou |
| 6,698,967 B2 | * | 3/2004 | Henrich et al. .............. 403/325 |
| 2007/0266817 A1 | * | 11/2007 | Lassiter ..................... 74/551.8 |

* cited by examiner

*Primary Examiner*—Vicky A Johnson
(74) *Attorney, Agent, or Firm*—Roeder & Broder LLP; James P. Broder (57) ABSTRACT

An adjustment assembly (32) for adjusting the tension of a cable (18) includes a housing positioner (40), an adjuster (42) and a mover assembly (44). The housing positioner (40) positions a portion of the cable housing (16). The adjuster (42) moves to adjust the position of the housing positioner (40) relative to the cable (18). The mover assembly (44) moves the adjuster (42) to adjust the position of the housing positioner (40) to adjust the tension of the cable (18). A portion of the mover assembly (44) can rotate in one direction to cause rotation of the adjuster (42) in an opposite direction. Rotation of the adjuster (42) causes the housing positioner (40) to move linearly to alter the tension of the cable (18). The mover assembly (44) can include a portion that moves between an engaged position and a disengaged position. In the engaged position, movement of the mover assembly (44) adjusts the tension of the cable (18). In the disengaged position, the mover assembly (44) is mechanically decoupled from the housing positioner (40) so that no adjustment of the cable tension occurs.

38 Claims, 6 Drawing Sheets

CABLE TENSION ADJUSTMENT ASSEMBLY

RELATED APPLICATION

This Application claims the benefit on U.S. Provisional Application Ser. No. 60/633,344 filed on Dec. 4, 2004. The contents of U.S. Provisional Application Ser. No. 60/633,344 are incorporated herein by reference.

BACKGROUND

Recreational riding and competitive racing of two- and four-wheeled vehicles such as bicycles, motorcycles and all-terrain vehicles has become increasingly popular in recent years. Riders and drivers (also sometimes generically referred to herein as "users") place great value on the ability to precisely control the functional operability of important mechanical components on their vehicles. For instance, during the course of a race, the activation of a motorcycle clutch lever can vary significantly. More specifically, the engagement position and the sensitivity change as the clutch mechanism materials wear or the frictional properties fluctuate as a result of temperature variations in certain relevant components. Further, dirt, water, mud or other debris in and around the lever assembly can impact the level of friction for various cables, such as clutch cables, brake cables, etc.

Accordingly, as the act of riding and racing a vehicle requires a high level of attention, having cable adjustment controls which function in a fluid and natural fashion while the vehicle is being ridden is also highly valued. Prior methods for controlling the clutch cable slack, associated lever throw and/or position engagement are not altogether satisfactory. For example, these methods can be clumsy and cannot offer the required level of precision and ease for use at high speeds and under race conditions.

In fact, many such prior art adjustment methods lack an "on-the-fly" type of adjustment. Further, some adjusters that can potentially be used on-the-fly utilize a threaded barrel adjuster with a separate lock nut arrangement. More advanced on-the-fly adjusters have simply enlarged the shape of the barrel adjuster knob, and have omitted the lock nut convention. These contemporary on-the-fly adjusters can have additional setbacks. First, with these types of adjuster assemblies, due to the positioning of the adjuster, it is necessary for the rider to fully remove his or her hand from the handlebar grip in order to activate the control. With the hand in this position, the rider is subject to loss of control of the motorcycle, which can lead to serious injuries. Further, because the rider must move his hand to a particular position, the rider may need to momentarily take his or her eyes off the road, track or other surface, which can be dangerous at higher speeds.

Another potential shortcoming of these on-the-fly adjusters is in the matter of positive selection. The adjustment of cable slack is controlled by rotation of the threaded barrel adjuster. The full range of the rotational adjustment is commonly on the order of 10 full rotations, or 3600 degrees of movement. The amount of adjustment that a rider will typically want for an on-the-fly adjustment is on the order of less than a millimeter of linear cable movement relative to the cable housing, which can translate to approximately 30 to 180 degrees of rotational movement at a time. Further, many contemporary on-the-fly adjusters lack provisions that limit the amount of slack adjusted. With these types of assemblies, it is necessary for the rider to rely on sensing the right amount of rotation adjustment, which can be difficult, if not impossible, during a high-speed and/or jarring ride.

SUMMARY

The present invention is directed toward an adjustment assembly for adjusting the tension of a cable of a motorized or non-motorized vehicle such as a bicycle, a motorcycle or an all-terrain vehicle. The motorized vehicle can include a cable mover that moves between a first position and a second position to move the cable relative to a cable housing, thereby remotely actuating a device such as a clutch. In one embodiment, the adjustment assembly includes a housing positioner, an adjuster and a mover assembly. The housing positioner positions a portion of the cable housing. The adjuster moves to adjust the position of the housing positioner relative to the cable while the cable mover remains in one of the positions. The mover assembly moves the adjuster to adjust the position of the housing positioner relative to the cable to adjust the tension of the cable.

In one embodiment, a portion of the mover assembly rotates in a first rotational direction to cause rotation of at least a portion of the adjuster in an opposite, second rotational direction. Rotation of the adjuster in the second rotational direction causes the housing positioner to move in a substantially linear direction. In accordance with one embodiment, the portion of the mover assembly rotates about a first axis, and the portion of the adjuster rotates about a second axis that is different than the first axis. The mover assembly can include a ratcheting mechanism. In this embodiment, the mover assembly can rotate the adjuster by a predetermined angle of rotation. For example, in one such embodiment, the predetermined angle of rotation is greater than approximately 30 degrees and less than approximately 90 degrees. In another example, the predetermined angle of rotation is approximately 60 degrees. This predetermined angle of rotation can correspond to linear movement of the housing positioner of a predetermined distance.

In another embodiment, the mover assembly includes a portion that selectively moves between an engaged position and a disengaged position. In the engaged position, movement of the mover assembly results in an adjustment of the position of the housing positioner relative to the cable to adjust the tension of the cable. In the disengaged position, the mover assembly is mechanically decoupled from the housing positioner so that the movement of the mover assembly results in no adjustment of the position of the housing positioner relative to the cable, and the adjuster can be moved manually, if desired.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention is directed toward a cable mover assembly for a bicycle, motorcycle, all-terrain vehicle (ATV) or other motorized or non-motorized vehicles that use a cable-actuated device. Although the description provided herein is particularly suited to and focuses on a clutch lever assembly that actuates a clutch on a motorcycle, it is recognized that the present invention can be used in conjunction with a variety of other cable-actuated devices on any type of vehicle. For example, the present invention can be used to adjust the tension of a brake cable that is actuated by a brake lever assembly, or any other suitable type of cable.

Figure 1:
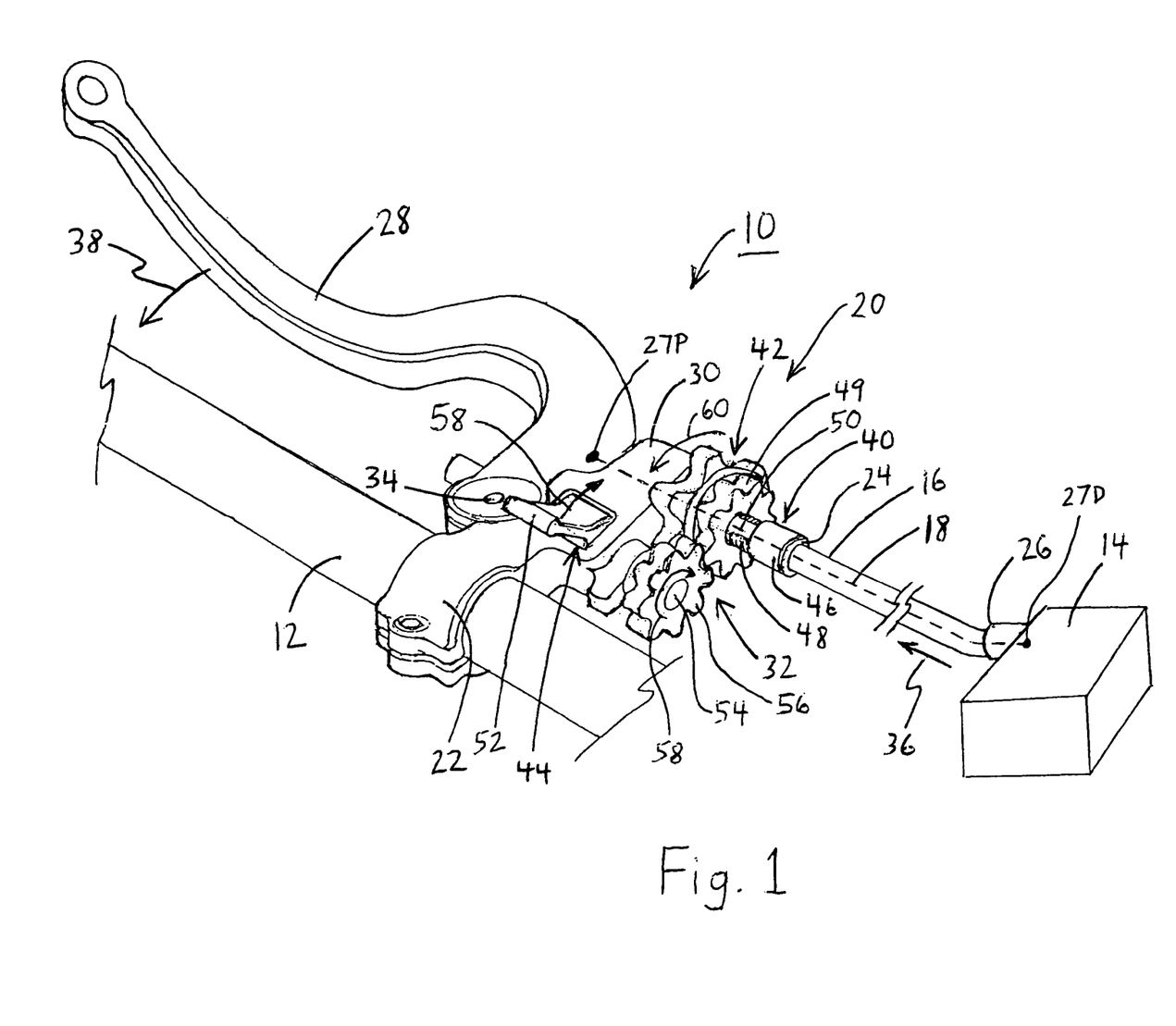
FIG. 1 is a perspective view of a portion of a vehicle including a steering control, a cable-actuated device and a cable mover assembly having features of the present invention, including an adjustment assembly.

FIG. 1 is a top perspective view of a portion of a vehicle 10 including a portion of a steering control 12, a cable-actuated device 14, a cable housing 16, a cable 18 (illustrated as a dashed line in FIG. 1) and one embodiment of the cable mover assembly 20. The steering control 12 can include handlebars, a steering wheel or any other controls for steering or guiding the direction of the vehicle 10. Further, the steering control 12 can include a grip (not shown) that allows the user to maintain a consistent grasp of the steering control 12. Typical grips can be formed from rubber, or various synthetic and/or plastic materials.

The cable-actuated device 14 can include a clutch, a brake assembly, a throttle assembly or any other suitable cable-actuated device. In this embodiment, the cable mover assembly 20 is coupled to the steering control 12 with an attacher 22. The attacher 22 can include a clamp-type device or any other suitable means of attaching the cable mover assembly 20 to the steering control 12. Alternatively, the cable mover assembly 20 can be secured to another structure of the vehicle 10. The attacher 22 can be integrally formed with a portion of the cable mover assembly 20, or the attacher 22 can be a separate structure that is secured to the cable mover assembly 20.

The cable-actuated device 14 can be positioned on or within the vehicle 10 near the cable mover assembly 20 or in a location that is remote from the cable mover assembly 20. For example, the cable-actuated device 14 can be a clutch, which can be positioned in a completely different location on the motorcycle, such as near an engine (not shown). In this example, movement of the cable 18 by the user (as described below) activates or engages the clutch from a relatively remote location, e.g., near the steering control 12.

The cable housing 16 substantially encircles the cable 18 to protect the cable 18 from contamination from elements such as sun, dirt, water, mud or other debris. Further, the cable housing 16 functions as a fixed length guide channel within which the cable 18 must be positioned. In one embodiment, the cable housing typically has a first end 24 and a second end 26. The first end is positioned at or near the cable mover assembly 20. The second end 26 is positioned at or near the cable-actuated device 14. The cable housing 16 can be formed from various relatively flexible materials such as plastics or other synthetic materials, as non-exclusive examples.

The cable 18 courses through the housing, connecting the cable-actuated device 14 with the cable mover assembly 20. The cable 18 can be formed from various materials having suitable strength properties, such as certain metals and/or metal alloys, or from any other appropriate materials known to those skilled in the art. In one embodiment, the cable 18 includes a proximal end 27P that is secured to the cable mover assembly 20, and a distal end 27D that is secured at or near the cable-actuated device 14.

The cable mover assembly 20 moves the cable 18 to activate the device 14. Further, the cable mover assembly 20 adjusts a resting tension of the cable 18 to the level desired by the user. The design of the cable mover assembly 20 can vary depending upon the design requirements of the vehicle 10. The components of the cable mover assembly 20 can be machined, cast, molded or forged from various materials such as stock aluminum, stainless steel, titanium and other metal alloys, carbon fiber, certain plastics or other synthetic materials, or any other composition of material having the appropriate strength, rigidity and weight. In the embodiment illustrated in FIG. 1, the cable mover assembly 20 can include a cable mover 28, a mover body 30, and an adjustment assembly 32.

The cable mover 28 illustrated in FIG. 1 includes a lever that can be moved toward and away from the steering control 12 by the user. Alternatively, the cable mover 28 can include another suitable type of structure such as a pedal. In one embodiment, the cable mover 28 is biased toward a first position (also referred to as a "resting position", as illustrated in FIG. 1) by the cable 18. The user can squeeze the cable mover 28 toward the steering control 12, thereby rotating the cable mover 28 about a cable mover axis 34. Moving the cable mover 28 toward the steering control 12 effectively pulls the cable 18 in a direction (illustrated by arrow 36) toward the cable mover assembly 20 and/or away from the device 14, thereby activating the device 14. As used herein, when the cable mover 28 is moved in a direction (illustrated by arrow 38) toward the steering control 12, e.g., away from the first position, the cable mover 28 is said to be in a non-resting or second position.

The mover body 30 can be secured to or can be integrally formed with the attacher 22. Further, the mover body 30 can also serve as a chassis that supports, secures and/or retains the cable mover 28 and/or portions of the adjustment assembly 32.

The adjustment assembly 32 precisely adjusts the tension of the cable 18 to the desire of the user. This adjustment can be performed both while the vehicle 10 is stopped, or during movement of the vehicle 10 such as during a recreational ride or a race. The design of the adjustment assembly 32 can be varied to suit the design requirements of the vehicle 10. In the embodiment illustrated in FIG. 1, the adjustment assembly 32 includes a housing positioner 40, an adjuster 42 and a mover assembly 44.

The housing positioner 40 retains and secures the first end 24 of the cable housing 16. The configuration of the housing positioner 40 can vary. In the embodiment illustrated in FIG. 1, the housing positioner 40 includes a retainer section 46 and an extension section 48. The retainer section 46 retains a portion, e.g., the first end 24 of the cable housing 16. The extension section 48 extends at least partially into the adjuster 42 and/or the mover body 30. In one embodiment, the extension section 48 can be a lead screw that has at least partial exterior threads which interact with a portion of the adjuster 42 to cause the housing positioner 40 to move relative to the adjuster 42, as described in greater detail below. Moreover, in one embodiment, the housing positioner 40 is retained by the mover body 30 in a non-rotational orientation relative to the mover body 30.

In the embodiment illustrated in FIG. 1, the adjuster 42 interacts with the housing positioner 40 (as indicated above) and the mover assembly 44 to adjust the tension of the cable 18. The specific design of the adjuster 42 can vary depending upon the requirements of the housing positioner 40 and the mover assembly 44. In the embodiment illustrated in FIG. 1, the adjuster 42 includes an adjuster gear 49 having internal threads (not shown in FIG. 1) that engage the external threads of the housing positioner 40. Further, the adjuster gear engages a portion of the mover assembly 44. During activation, the adjuster 42 rotates about an adjuster axis that approximates or is the same as a longitudinal axis 50 (illustrated as a dashed line) of the housing positioner 40. In one embodiment, this rotation causes the housing positioner 40 to non-rotationally extend in a direction away from or toward the proximal end 27P of the cable 18, substantially along the longitudinal axis 50 of the housing positioner 40.

The mover assembly 44 causes the rotation of the adjuster 42 outlined above. The design of the mover assembly 44 can vary widely. In the embodiment illustrated in FIG. 1, the mover assembly 44 includes a mover 52, a drive shaft 54 and a drive gear 56. In this embodiment, the positioning of the mover 52 allows the user to easily move the mover 52 in a first rotational direction with the user's thumb (not shown), for example, without the user taking his or her hand off the steering control 12. Movement of the mover 52 in a first rotational direction (illustrated by arrows 58), causes rotation of the drive shaft 54 and the drive gear 56 also in the first rotational direction 58. The drive gear 56 is meshed and thereby interacts with the adjuster 42, causing rotation of at least a portion of the adjuster 42 in a second rotational direction 60 that is opposite the first rotational direction 58. For example, if the drive gear 56 rotates in a clockwise direction, the adjuster 42 rotates in a counterclockwise direction.

In the embodiment illustrated in FIG. 1, the mover assembly 44 includes a ratcheting mechanism for rotation of the drive shaft 54 and the drive gear 56 in one rotational direction. It is recognized, however, that other suitable mechanical means can be used for the mover assembly 44 instead of the ratcheting mechanism, provided movement of the mover assembly 44 results in movement of the housing positioner 40 in a substantially linear manner to adjust the tension of the cable 18 as desired.

Further, the mover assembly 44 can be directly secured to, or can include, the adjuster 42 so that rotational movement of the mover assembly 44 directly rotates the adjuster 42. In this embodiment, rotation of the adjuster 42 results in extension of the housing positioner 40 in a substantially similar manner as described above, although the rotational direction upon rotation of the adjuster 42 may be reversed if necessary.

Figure 2A:
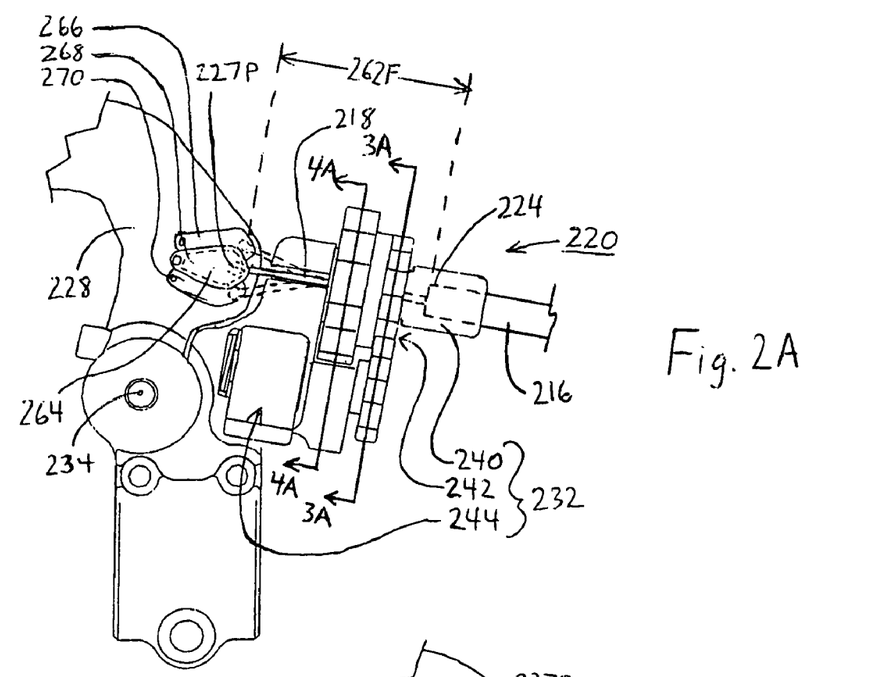
FIG. 2A is a top view of a portion of the adjustment assembly, including a housing positioner shown in a first position.

FIG. 2A is a top view of a portion of the cable 218, a portion of the cable housing 216, and a portion of one embodiment of the cable mover assembly 220 including the adjustment assembly 232 shown in a first position. In the first position, the extension section 248 of the housing positioner 240 can be completely threaded into the adjuster 242 so that the threads of the extension section 248 are not visible, as illustrated in FIG. 2A. In the first position illustrated in FIG. 2A, the mover assembly 244 has not been actuated, as explained in greater detail below. Thus, in the first position, a first distance 262F from the first end 224 (shown in phantom) of the cable housing 216 to the proximal end 227P (shown in phantom) of the cable 218 is relatively short. As a result, in the first position, the tension of the cable 218 is at an initial tension level which is relatively low. Alternatively, in the first position, the extension section 248 of the housing positioner 240 can be at least partially threaded into the adjuster 242 so that at least some of the threads of the extension section 248 are visible.

In the embodiment illustrated in FIG. 2A, the proximal end 227P of the cable 218 is secured to the cable mover 228. In this embodiment, the cable mover 228 includes a force adjuster 264 that secures the proximal end 227P of the cable 218. The force adjuster 264 adjusts the distance between the proximal end 227P of the cable 218 and the cable mover axis 234.

In one embodiment, the force adjuster 264 can be positioned in one of a plurality of positions, including a first position 266, a second position 268 and a third position 270. Although three positions 266, 268, 270 are illustrated in FIG. 2A, the number of positions can be greater or fewer than three. The proximal end 262 of the cable 218 attaches to the force adjuster 264. In the first position 266, the distance between the cable attachment and the pivot point 234 is the greatest, and results in the most amount of force being required to squeeze the cable mover 228. In the second position 268, the distance is somewhat less, requiring a lesser force to squeeze the cable mover 228, and in the third position 270, the distance is even less, requiring the least amount of force of the three positions 266, 268, 270.

The force adjuster 264 can be fixedly secured into one of the three positions 266, 268, 270 using a screw or other suitable fastener. Alternatively, the force adjuster 268 can be moved between the positions 266, 268, 270 on the fly as required by the user.

Figure 2B:
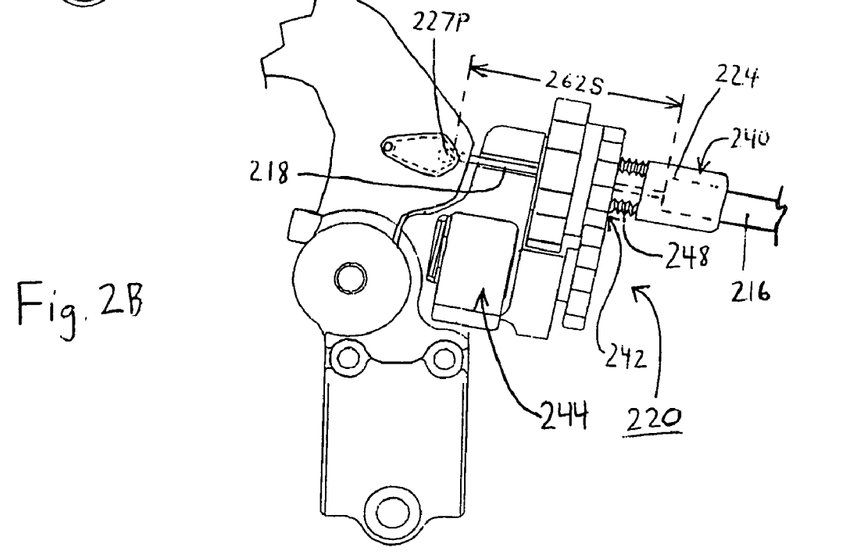
FIG. 2B is a top view of the cable mover assembly illustrated in FIG. 2A, including the housing positioner shown in a second position.

FIG. 2B is a top view of the portion of the cable mover assembly 220 illustrated in FIG. 2A, including the housing positioner 240 shown in a second position. In one embodiment, the housing positioner 240 moves from the first position (illustrated in FIG. 2A) to the second position relative to the adjuster 242 following actuation of the mover assembly 244, as explained in greater detail below. As illustrated in FIG. 2B, in the second position, the extension section 248 of the housing positioner 240 extends outwardly from the adjuster 242 so that more of the threads of the extension section 248 become visible compared with the housing positioner 240 being in the first position.

In the second position, a second distance 262S from the first end 224 (shown in phantom) of the cable housing 216 to the proximal end 227P (shown in phantom) of the cable 218 is somewhat greater than the first distance 262F (illustrated in FIG. 2A). Thus, in moving the housing positioner 240 from the first position to the second position, the overall length of the cable 218 between the cable-actuated device 14 and the force adjuster 264 has increased. The increased length of the cable 218 when the housing positioner 240 is in the second position results in a greater tension in the cable 218 than when the housing positioner 240 is in the first position relative to the adjuster 242.

Figure 3A:
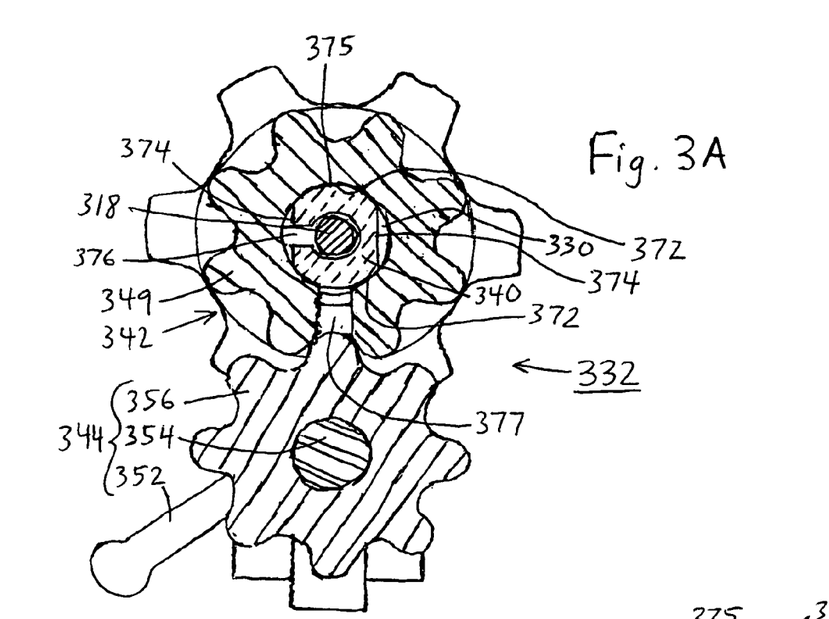
FIG. 3A is a cross-sectional view of a portion of the cable mover assembly taken on line 3A-3A in FIG. 2A, including a portion of the adjustment assembly shown in a first position.
Figure 3B:
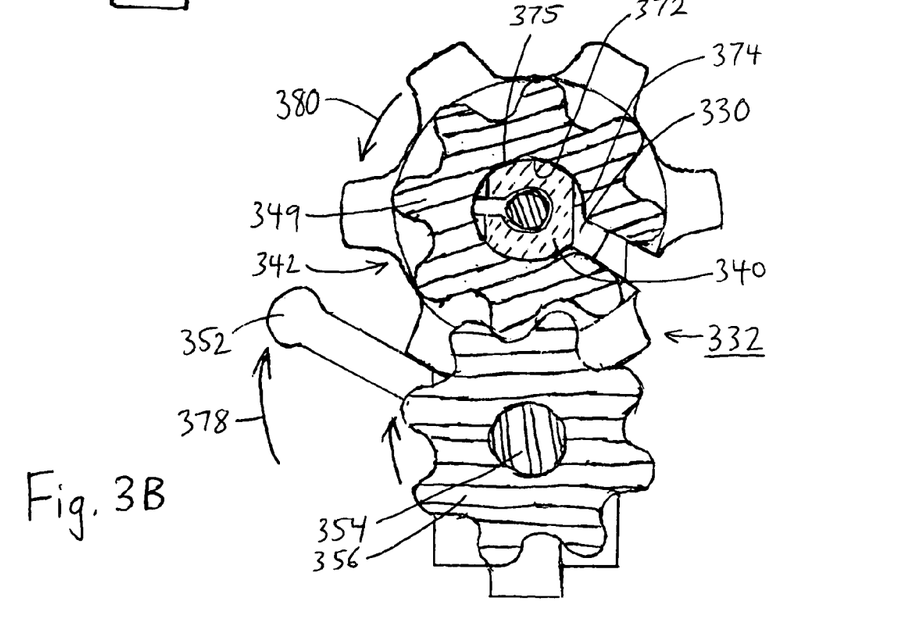
FIG. 3B is a cross-sectional view of the portion of the cable mover assembly illustrated in FIG. 3A, including the portion of the adjustment assembly shown in a second position.

FIGS. 3A and 3B illustrate relative movement between certain components of the adjustment assembly 332. FIG. 3A is a cross-sectional view taken on line 3A-3A in FIG. 2A, and illustrates of a portion of the adjustment assembly 332 in a first position. In this embodiment, the drive gear 356 of the mover assembly 344 is engaged with the adjuster gear 349 of the adjuster 342.

In this embodiment, the extension section 348 of the housing positioner 340 includes two opposing rounded, externally threaded regions 372 and one or more opposing, substantially straight, non-threaded regions 374. The externally threaded regions 372 threadedly engage internal threads 375 of the adjuster gear 349, whereas the non-threaded regions 374 do not engage the internal threads 375 of the adjuster gear 349. Instead, portions of the non-threaded regions 374 are in contact with mover body 330, as explained in greater detail below.

In one embodiment, one of the non-threaded regions 374 includes a positioner slot 376, and the adjuster 342 includes an adjuster slot 377. When properly aligned, e.g., when the positioner slot 376 and the adjuster slot 377 are both positioned at approximately a nine o'clock position, installation and/or removal of the cable 318 from the cable mover assembly 320 is facilitated. For reference, in FIG. 3A, the positioner slot 376 is oriented at approximately the nine o'clock position, while the adjuster slot 377 is oriented at approximately a six o'clock position. The slots 376, 377 can extend longitudinally in a direction similar or identical to that of the orientation of the cable 318.

FIG. 3B illustrates the portion of the adjustment assembly 332 in a second position, following a complete actuation of the mover 352 of the mover assembly 344 in a first rotational direction (indicated by directional arrow 378). Movement of the mover 352 in the first rotational direction likewise results in rotation of the drive shaft 354 in the first rotational direction. Rotation of the drive shaft 354 also rotates the drive gear 356 in the first rotational direction. In this embodiment, because the drive gear 356 is engaged with the adjuster gear 349, rotation of the drive gear 356 in the first rotational direction results in rotation of the adjuster gear 349 in an opposite, second rotational direction (indicated by directional arrow 380) by a predetermined rotational angle.

During one complete actuation of the mover 352, the rotational range of motion, e.g., angle of rotation, of the mover 352, the drive shaft 354, the drive gear 356 and/or the adjuster gear 349 can be varied depending upon the design requirements of the adjustment assembly 332 and the cable mover assembly 220 (illustrated in FIG. 2A). For example, the rotational range of motion can be any rotational angle between zero and 360 degrees. More specifically, in non-exclusive alternative embodiments, the rotational range of motion of the mover 352, the drive shaft 354, the drive gear 356 and/or the adjuster gear 349 can be at least approximately 15, 30, 45, 60, 75, 90, 120, 150 and 180 degrees. Alternatively, the rotational range of motion can be between these angles or outside this range of angles.

The specific range of motion for each of these structures corresponds to a predetermined linear movement of the housing positioner 340. Stated another way, as a non-exclusive example, rotation of the drive gear 356 and/or the adjuster gear 349 by approximately 60 degrees can result in a specific, predetermined linear distance that the housing positioner 340 is moved. In this example, 60 degrees equates to one-sixth of a full rotation. Thus, a rotation of the adjuster gear 349 by 60 degrees translates to a linear movement equal to one-sixth of the distance between the threads of the housing positioner 340.

In another embodiment, the predetermined linear distance that the housing positioner 340 is moved can be between approximately 0.01-2.0 millimeters for each full actuation of the mover 352. In still another embodiment, the housing positioner 340 moves between approximately 0.1-1.0 millimeters. In yet another embodiment, the housing positioner 340 moves between approximately 0.2-0.5 millimeters. It is recognized that these ranges are provided as examples only, and are not intended to be limiting. Movement of the housing positioner can be outside of the foregoing ranges.

It is recognized that the mover 352, the drive shaft 354, the drive gear 356 and/or the adjuster gear 349 can be configured to have different rotational ranges of motion relative to one another for one complete actuation of the mover 352. Alternatively, the rotational ranges of motion can all be substantially the same.

In the embodiment illustrated in FIG. 3B, rotation of the adjuster gear 349 in the second direction results rotation of the internal threads 375 of the adjuster 342, which are engaged with the external threads 372 of the housing positioner 340. Because the non-threaded region(s) 374 of the housing positioner 340 can be retained by the mover body 330 in a non-rotational manner, in accordance with this embodiment, rotation of the adjuster 342 causes the housing positioner 340 to extend substantially linearly in a direction away from the adjuster 342.

Following actuation of the mover 352 in the first rotational direction 378, the mover 352 can be biased in a direction opposite the first rotational direction 378 to return the mover 352 to the first position (illustrated in FIG. 3A). As provided in greater detail below, return of the mover 352 to the first position results in little or no rotation of the adjuster 342. Thus, the housing positioner 340 is substantially unaffected by return of the adjustment assembly 332 to the first position.

As used herein, the term "first rotational direction" can be a clockwise rotation (as indicated in FIG. 3B) or a counterclockwise rotation, and is provided for ease of explanation. The term "second rotational direction" can also be either clockwise or counterclockwise, but in this embodiment the second rotational direction is directly opposite the first rotational direction. In any event, the indicated direction of rotation is not intended to limit the scope of the invention in any manner.

In addition to the preceding embodiment, or in an alternative embodiment, the adjustment assembly 332 can be configured so that the housing positioner 340 can move in a direction toward the adjuster 342 upon actuation of the mover 352. For example, actuation of the mover 352 in one direction causes the housing positioner 340 to move linearly in a direction away from the adjuster 342, while actuation of the mover 352 in the opposite direction consequently causes the housing positioner 340 to move in an opposite direction, e.g., toward the adjuster 342. In this embodiment, the mover assembly 344 can include an additional mover (not shown) that causes substantially the opposite effect of the mover 352 previously described, resulting in movement of the housing positioner 340 in a direction toward the adjuster 342 upon actuation of the additional mover.

It is recognized that alternative means for causing rotation of the adjuster and/or linear movement of the housing positioner can be incorporated in the present invention. In one non-exclusive embodiment, rotation of a portion of the mover assembly 344 results in movement of a belt (not shown) that can be engaged with the adjuster 342, thereby causing rotation of the adjuster 342. Any other suitable mechanical or electromechanical means known to those skilled in the art of remotely causing rotation of the adjuster 342 can likewise be incorporated into the present invention.

Figure 4A:
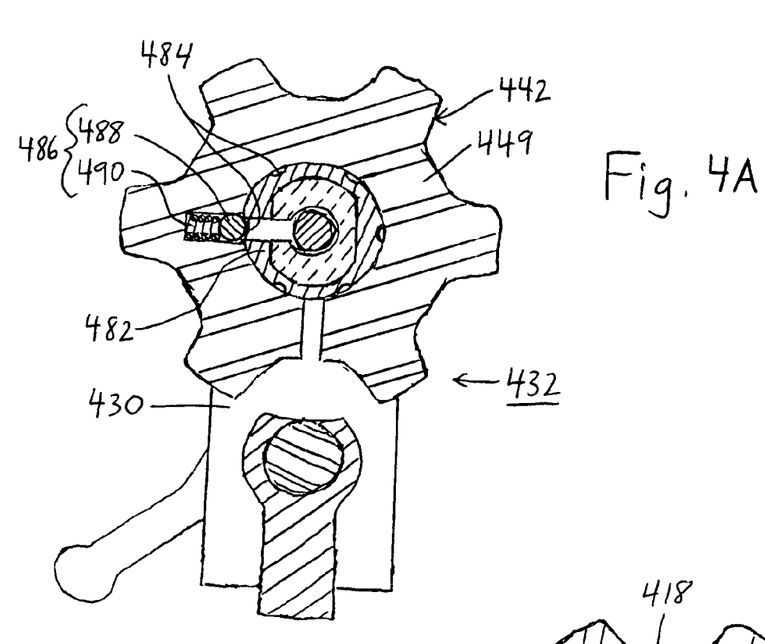
FIG. 4A is a cross-sectional view of a portion of the cable mover assembly taken on line 4A-4A in FIG. 2A, including a portion of the adjustment assembly shown in the first position as illustrated in FIG. 3A.
Figure 4B:
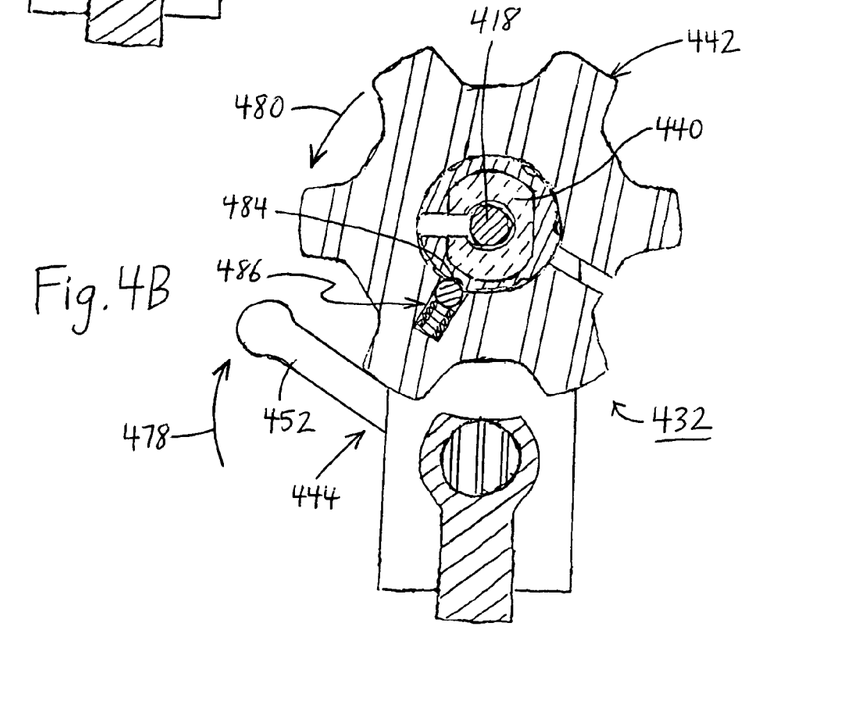
FIG. 4B is a cross-sectional view of the portion of the cable mover assembly illustrated in FIG. 4A, including a portion of the adjustment assembly shown in the second position as illustrated in FIG. 3B.

FIGS. 4A and 4B illustrate relative movement between certain components of the adjustment assembly 432. FIG. 4A is a cross-sectional view taken on line 4A-4A in FIG. 2A, and illustrates of a portion of the adjustment assembly 432 in a first position. In FIGS. 4A and 4B, the drive gear 356 (illustrated in FIGS. 3A and 3B) and the portion of the adjuster 442 that engages the drive gear 356 have been omitted.

In the embodiment illustrated in FIG. 4A, the adjuster body 430 includes an axle 482 on which the adjuster gear 449 rotates. In this embodiment, the axle 482 is stationary, e.g. does not rotate. Further, the axle 482 can include one or more axle detents 484 that engage a portion of the adjuster 442. In the embodiment illustrated in FIG. 4A, the axle 482 includes six axle detents 484 that are evenly spaced apart at intervals of approximately 60 degrees of rotation. It is recognized that this spacing is merely representative of one embodiment and is not intended to be limiting in any manner. For example, the spacing can be at intervals of greater or less than 60 degrees of rotation. Still alternatively, the spacing can be at uneven intervals.

Further, in this embodiment, the adjuster 442 can include an axle engager 486 for selectively engaging one of the axle detents 484 during rotation of the adjuster 442 about the axle 482. The design of the axle engager 486 can vary. In one embodiment, the axle engager 486 can include a ball bearing 488 and an axle detent bias 490 that biases the ball bearing 488 toward one of the axle detents 484 for rotation precision and for decreasing unwanted rotation of the adjuster 442 during periods of non-adjustment. The axle detent bias 490 can be a spring or another type of resilient member that urges the ball bearing 488 toward one of the axle detents 484 to temporarily secure the adjuster 442 in position.

FIG. 4B illustrates the portion of the adjustment assembly 432 in the second position, following a complete actuation of the mover 452 of the mover assembly 444 in the first rotational direction (indicated by directional arrow 478). As provided above, movement of the mover 452 in the first rotational direction 478 likewise results in rotation of the adjuster 442 in the second rotational direction (indicated by arrow 480) which is opposite the first rotational direction 478. Following rotation of the adjuster 442 in the second rotational direction 480, the axle engager 486 engages an axle detent 484 that is adjacent to the previously-engaged axle detent 484.

Each successive movement of the mover 452 in the first rotational direction 478 causes rotation of the adjuster 442 in the second rotational direction 480 so that the axle engager 486 engages the next adjacent axle detent 484. With this design, upon complete actuation of the mover 452, the housing positioner 440 extends a predetermined distance away from the proximal end 27P (illustrated in FIG. 1) of the cable 418. The predetermined extension distance of the housing positioner 440 can be varied depending upon the threading of the housing positioner 440 and the adjuster 442, and the extent of the rotation of the various components of the adjustment assembly 432 during each complete actuation of the mover 452.

Figure 5A:
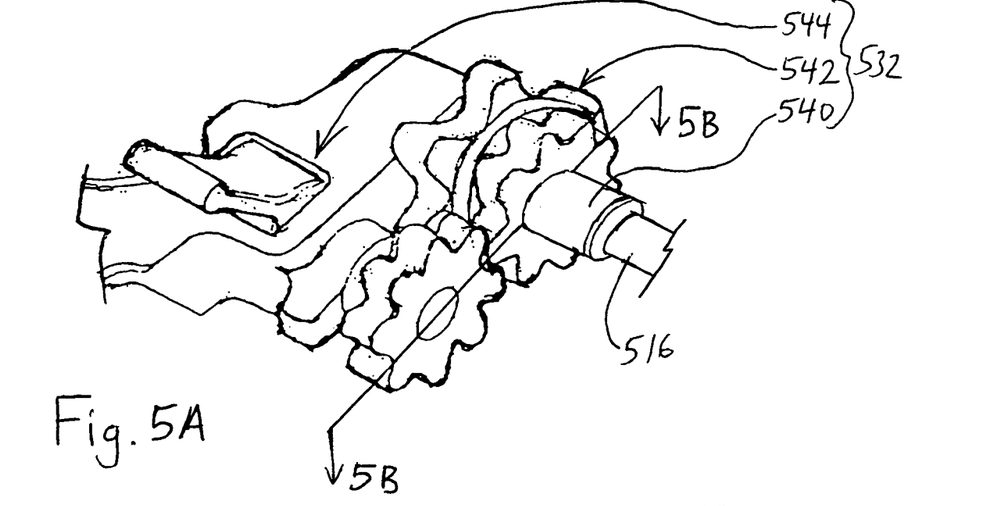
FIG. 5A is a enlarged, perspective view of a portion of the cable mover assembly illustrated in FIG. 1.

FIG. 5A is a top perspective view of a portion of the cable housing 516, and one embodiment of the adjustment assembly 532, including the housing positioner 540, the adjuster 542 and the mover assembly 544.

Figure 5B:
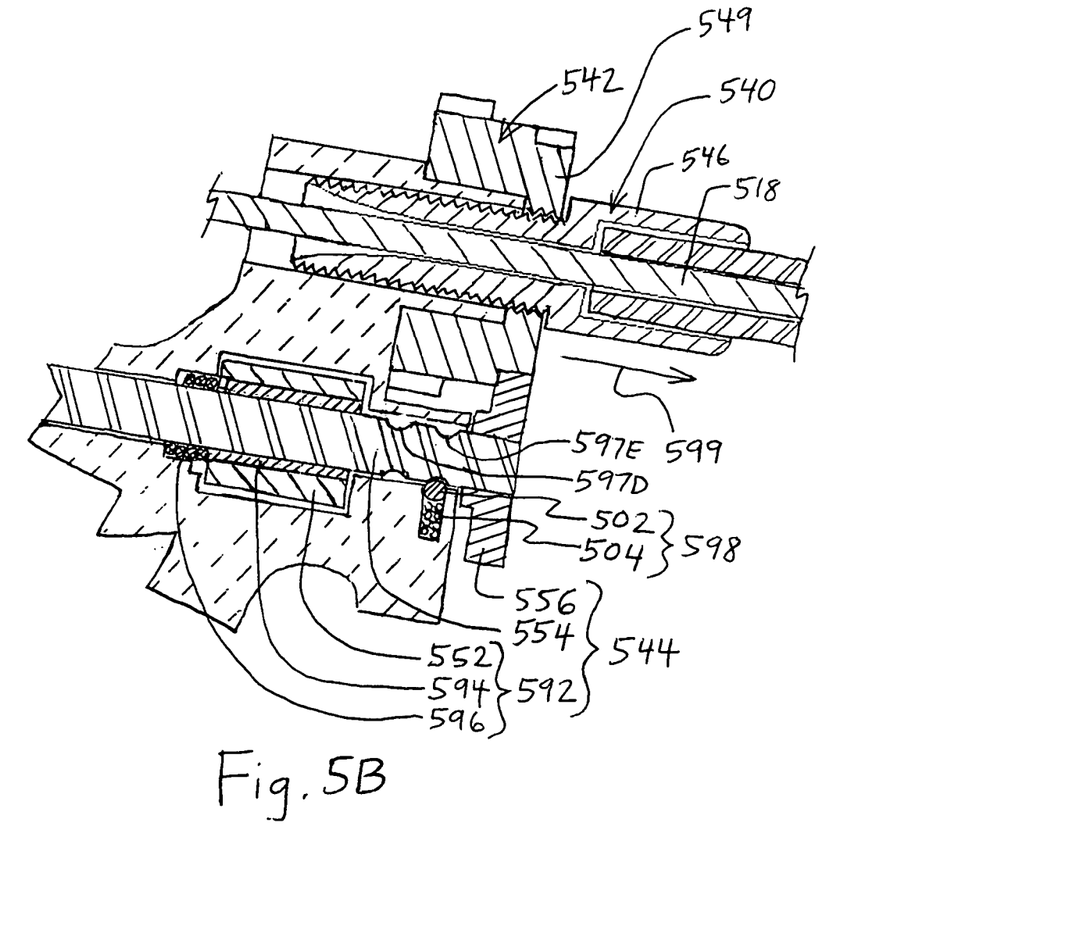
FIG. 5B is a cross-sectional view of a portion of the cable mover assembly taken on line 5B-5B in FIG. 5A.

FIG. 5B is a cross-sectional view of a cable 518, as well as the cable housing 516 and the adjustment assembly 532 taken on line 5B-5B in FIG. 5A. In this embodiment, the mover assembly 544 includes a rotator assembly 592 that rotates the drive shaft 554, and thus, the drive gear 556. In one embodiment, the rotator assembly 592 includes a ratchet assembly that includes the mover 552, a rotator clutch 594, and a mover return 596.

In this embodiment, the rotator clutch 594 allows movement of the mover 552 to cause rotation of the drive shaft 554 when the mover 552 is rotated in the first rotational direction 478 (illustrated in FIG. 4B). However, the rotator clutch 594 releases the drive shaft 554 when the mover 552 rotates in the opposite direction back to the first position (illustrated in FIG. 4A), therefore not inducing further rotation of the drive shaft 554 in any direction. The mover return 596 biases the mover 552 back to the first position (illustrated in FIG. 3A, for example). The mover return 596 can include a spring mechanism or any other suitable bias that returns the mover 552 back to the first position.

In the embodiment illustrated in FIG. 5B, the drive shaft 554 includes a disengagement detent 597D and an engagement detent 597E. Moreover, the mover body 530 includes a mover engager 598 that aligns with and engages one of the detents 597D, 597E to position a portion of the mover assembly 544, e.g., the drive shaft 554 and the drive gear 556, as required by the user as described in greater detail below. The design of the mover engager 598 can be varied depending upon the design requirements of the cable mover assembly 20 (illustrated in FIG. 1). In this embodiment, the mover engager 598 can include a ball bearing 502 and a mover detent bias 504 that biases the ball bearing 502 toward one of the detents 597D, 597E as selectively determined by the user.

As provided herein, when the drive gear 556 is engaged with the adjuster gear 549, rotation of the drive gear 556 causes counter-rotation of the adjuster gear 549. This counter-rotation of the adjuster gear 549 results in substantially linear movement of the retainer section 546 of the housing positioner 540 in a direction away from the adjuster 542, as illustrated by arrow 599, thereby increasing resting tension in the cable 518.

Figure 6A:
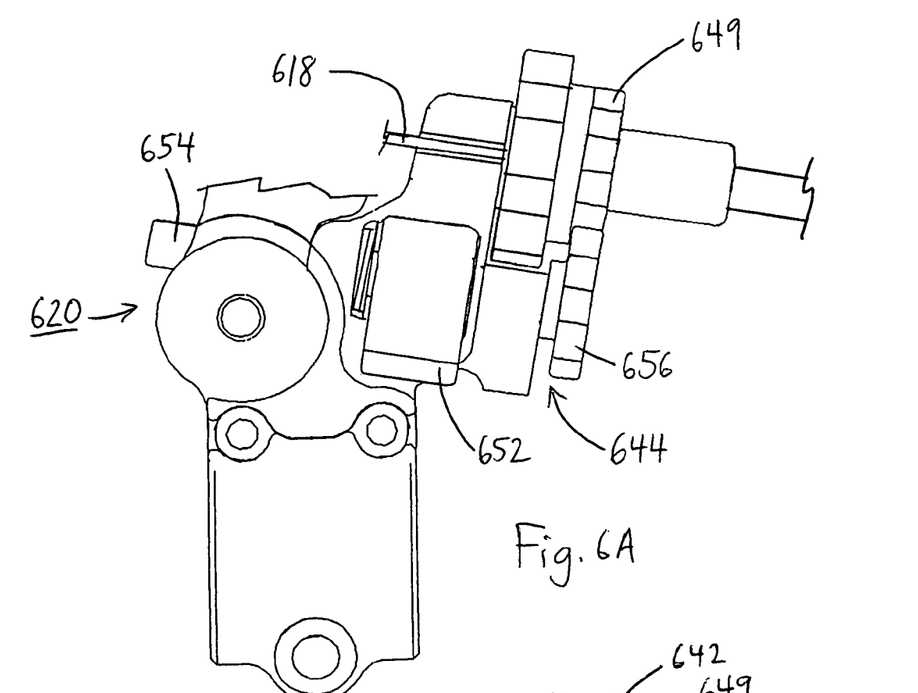
FIG. 6A is a top view of a portion of one embodiment of the cable mover assembly, illustrated in an engaged position.

FIG. 6A is a top view of a portion of the cable mover assembly 620 with the mover assembly 644 in an engaged position. In the engaged position, the drive gear 656 is engaged with the adjuster gear 649 so that rotation of the drive gear 656 results in counter-rotation of the adjuster gear 649. Consequently, in the engaged position, the tension of the cable 618 can be adjusted by the user.

Figure 6B:
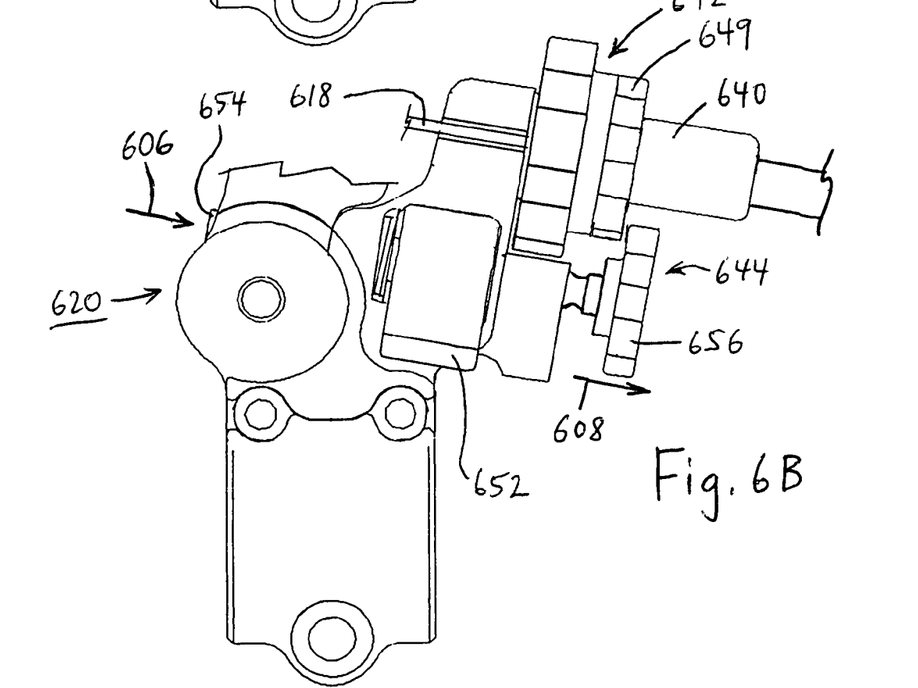
FIG. 6B is a top view of the portion of the cable mover assembly illustrated in FIG. 6A, illustrated in a disengaged position.

FIG. 6B is a top view of a portion of the cable mover assembly 620 with the mover assembly 644 in a disengaged position. In the disengaged position, the drive shaft 654 is positioned so that the mover engager 598 (illustrated in FIG. 5B) is engaged with the disengagement detent 597D (illustrated in FIG. 5B). In this position, the drive gear 656 is not engaged with the adjuster 642. Stated another way, in the disengaged position, the mover assembly 644 is decoupled from the adjuster 642.

In one embodiment, in the disengaged position, the drive shaft 654 can still rotate upon rotation of the mover 652. However, in this embodiment, in the disengaged position, rotation of the drive gear 656 results in no rotation of the adjuster gear 649. In an alternative embodiment, in the disengaged position, the drive shaft 654 does not rotate upon rotation of the mover 652. Thus, in this alternative embodiment, rotation of the mover 652 does not result in rotation of the drive gear 656. Consequently, no rotation of the adjuster gear 649 occurs. In either of the above-described embodiments, in the disengaged position, the adjuster gear 649 is not rotated, despite rotation of the drive gear 656. Thus, in the disengaged position, rotation of the drive gear 656 does not adjust the tension of the cable 618 until the mover assembly 644 is re-engaged with or re-coupled to the adjuster 642.

In one embodiment, in the disengaged position, the adjuster 642 can be manually rotated, e.g., using the thumb of the rider. In particular, the adjuster 642 can be manually rotated in a direction opposite the second rotational direction 480 (illustrated in FIG. 4B). Stated another way, the adjuster 642 is manually rotated in a direction that is opposite its usual rotational direction when the adjuster 642 is coupled to the mover assembly 644. In so doing, the housing positioner 640 is likewise moved in a direction opposite its usual direction of movement that occurs when the adjuster 642 is coupled to the mover assembly 644. In other words, the housing positioner 640 moves in a direction opposite the directional arrow 599 (illustrated in FIG. 5B), e.g., toward the adjuster 642. With this design, the user can "reset" the housing positioner 640 to allow greater or full range of movement of the housing positioner 640 for increasing the tension of the cable 618.

The mover assembly 644 can easily be moved between the engaged position (FIG. 6A) and the disengaged position (FIG. 6B) while the user is operating the vehicle, such as during a ride or drive, whether racing or for recreation. In the embodiment illustrated in FIGS. 6A and 6B, for example, the user can manually exert a force against the drive shaft 654 in a direction indicated by arrow 606. For example, this can be accomplished with the thumb (or another portion) of the hand nearest the cable mover assembly 620. This force causes the drive gear 656 to move in a direction indicated by arrow 608, effectively disengaging the drive gear 656 from the adjuster gear 649. As a result, any further rotation of the drive gear 656 does not cause any rotation of the adjuster gear 649, thereby disallowing the user to inadvertently or purposely increase (or decrease) the tension of the cable 618.

The user can re-engage the mover assembly 644 by exerting a force on the drive shaft 654 (or the drive gear 656) in a direction opposite that indicated by arrow 608, thereby returning the mover assembly 644 to the engaged position illustrated in FIG. 6A. Any suitable means for exerting the required force to engage and/or disengage the drive gear 656 with the adjuster 642 can be utilized. This force can be exerted directly on the drive shaft 654 and/or drive gear 656, or the force can be exerted indirectly on another structure that results in movement of the drive shaft 654 and/or drive gear 656 to engage and/or disengage the mover assembly 644 from the adjuster 642.

While the particular cable mover assembly 20 as herein shown and disclosed in detail is fully capable of obtaining the objects and providing the advantages herein before stated, it is to be understood that it is merely illustrative of some of the presently preferred embodiments of the invention and that no limitations are intended to the details of construction or design herein shown other than as described in the appended claims.

What is claimed is:

1. An adjustment assembly for adjusting the tension of a cable of a vehicle, the vehicle including a cable mover that moves between a first position and a second position to move the cable relative to a cable housing to remotely actuate a device, the adjustment assembly comprising:
    a housing positioner that positions a portion of the cable housing;
    an adjuster that moves to adjust the position of the housing positioner relative to the cable while the cable mover remains in one of the positions; and
    a mover assembly that contacts the adjuster, the mover assembly moving the adjuster to adjust the position of the housing positioner relative to the cable to adjust the tension of the cable.

2. The adjustment assembly of claim 1 wherein a portion of the mover assembly rotates in a first rotational direction to cause rotation of at least a portion of the adjuster in a second rotational direction that is substantially opposite the first rotational direction.

3. The adjustment assembly of claim 2 wherein rotation of the adjuster in the second rotational direction causes the housing positioner to move in a substantially linear direction.

4. The adjustment assembly of claim 2 wherein the portion of the mover assembly rotates about a first axis, and the portion of the adjuster rotates about a second axis that is different than the first axis.

5. The adjustment assembly of claim 4 wherein the first axis and the second axis are substantially parallel.

6. The adjustment assembly of claim 1 wherein the mover assembly includes a ratcheting mechanism.

7. The adjustment assembly of claim 1 wherein the mover assembly rotates the adjuster by a predetermined angle of rotation.

8. The adjustment assembly of claim 7 wherein the predetermined angle of rotation corresponds to linear movement of the housing positioner of a predetermined distance.

9. The adjustment assembly of claim 7 wherein the predetermined angle of rotation is greater than approximately 15 degrees and less than approximately 180 degrees.

10. The adjustment assembly of claim 7 wherein the predetermined angle of rotation is greater than approximately 30 degrees and less than approximately 90 degrees.

11. The adjustment assembly of claim 7 wherein the predetermined angle of rotation is approximately 60 degrees.

12. The adjustment assembly of claim 1 wherein a portion of the mover assembly selectively moves between an engaged position wherein the mover assembly is engaged with the adjuster, and a disengaged position wherein the mover assembly is mechanically decoupled from the adjuster so that the movement of the mover assembly results in no movement of the adjuster.

13. The adjustment assembly of claim 12 wherein the portion of the mover assembly rotates about an axis in the engaged position, and moves along the axis to move between the engaged position and the disengaged position.

14. The adjustment assembly of claim 13 wherein the portion of the mover assembly includes a detent that positions the portion of the mover assembly relative to the adjuster during movement between the engaged position and the disengaged position.

15. The adjustment assembly of claim 1 wherein the device is a clutch.

16. The adjustment assembly of claim 1 wherein the device is a brake.

17. A cable mover assembly including the cable mover that secures a portion of the cable and the adjustment assembly of claim 1.

18. A cable mover assembly for a vehicle, the cable mover assembly moving a cable through a housing to remotely actuate a device, the cable mover assembly comprising:
    a cable mover that moves from a first position to a second position to move the cable to activate the device, the cable mover including a cable retainer that retains a portion of the cable in a substantially fixed position relative to the cable mover; and
    an adjustment assembly including (i) a housing positioner that retains at least a portion of the housing, (ii) an adjuster that adjusts the position of the housing positioner relative to the cable while the cable mover is in one of the positions, and (iii) a mover assembly that contacts the adjuster, the mover assembly moving the adjuster to adjust the position of the housing positioner relative to the cable to adjust the tension of the cable.

19. The cable mover assembly of claim 18 wherein a portion of the mover assembly rotates in a first rotational direction to cause rotation of at least a portion of the adjuster in a second rotational direction that is substantially opposite the first rotational direction.

20. The cable mover assembly of claim 19 wherein rotation of the adjuster in the second rotational direction causes the housing positioner to move in a substantially linear direction.

21. The cable mover assembly of claim 19 wherein the portion of the mover assembly rotates about a first axis, and the portion of the adjuster rotates about a second axis that is different than the first axis.

22. The cable mover assembly of claim 18 wherein the mover assembly includes a ratcheting mechanism.

23. The cable mover assembly of claim 18 wherein the mover assembly rotates the adjuster by a predetermined angle of rotation.

24. The cable mover assembly of claim 23 wherein the predetermined angle of rotation corresponds to linear movement of the housing positioner of a predetermined distance.

25. The cable mover assembly of claim 23 wherein the predetermined angle of rotation is greater than approximately 30 degrees and less than approximately 90 degrees.

26. The cable mover assembly of claim 18 wherein a portion of the mover assembly selectively moves between an engaged position wherein the mover assembly is engaged with the adjuster, and a disengaged position wherein the mover assembly is mechanically decoupled from the adjuster so that the movement of the mover assembly results in no movement of the adjuster.

27. The cable mover assembly of claim 26 wherein the portion of the mover assembly rotates about an axis in the engaged position, and moves along the axis to move between the engaged position and the disengaged position.

28. The cable mover assembly of claim 18 wherein the device is a clutch.

29. An adjustment assembly for adjusting the tension of a cable of a vehicle, the vehicle including a cable mover that moves between a first position and a second position to move the cable relative to a cable housing to remotely actuate a device, the adjustment assembly comprising:

a housing positioner that positions a portion of the cable housing; and a mover assembly having a portion that selectively moves between an engaged position wherein a movement of the mover assembly adjusts the position of the housing positioner relative to the cable to adjust the tension of the cable while the cable mover remains in one of the first position or the second position, and a disengaged position wherein the mover assembly is mechanically decoupled from the housing positioner so that the movement of the mover assembly results in no adjustment of the position of the housing positioner relative to the cable.

30. The adjustment assembly of claim 29 wherein the mover assembly includes an adjuster that rotates about a first axis, and a drive gear that rotates about a second axis to cause rotation of the adjuster in an opposite direction about the first axis, the first axis being different than the second axis.

31. The adjustment assembly of claim 30 wherein rotation of the adjuster in the second rotational direction causes the housing positioner to move in a substantially linear direction.

32. The adjustment assembly of claim 30 wherein the adjuster rotates by a predetermined angle of rotation.

33. The adjustment assembly of claim 32 wherein the predetermined angle of rotation corresponds to linear movement of the housing positioner of a predetermined distance.

34. The adjustment assembly of claim 32 wherein the predetermined angle of rotation is greater than approximately 15 degrees and less than approximately 180 degrees.

35. The adjustment assembly of claim 29 wherein the mover assembly includes a ratcheting mechanism.

36. The adjustment assembly of claim 29 wherein the portion of the mover assembly rotates about an axis in the engaged position, and moves along the axis to move between the engaged position and the disengaged position.

37. The adjustment assembly of claim 36 wherein the portion of the mover assembly includes a detent that positions the portion of the mover assembly relative to the adjuster during movement between the engaged position and the disengaged position.

38. The adjustment assembly of claim 29 wherein the device is a clutch.

* * * * *

UNITED STATES PATENT AND TRADEMARK OFFICE
CERTIFICATE OF CORRECTION

PATENT NO. : 7,628,094 B2  Page 1 of 1
APPLICATION NO. : 11/203936
DATED : December 8, 2009
INVENTOR(S) : Mon Spencer Owyang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Second Day of November, 2010

David J. Kappos
*Director of the United States Patent and Trademark Office*